Dec. 5, 1967  D. M. NASH, JR  3,356,178

METHOD AND APPARATUS FOR SEISMIC EXPLORATION

Filed June 29, 1965  2 Sheets-Sheet 1

INVENTOR:
DAVID M. NASH, JR.
BY: *signature*
HIS ATTORNEY

United States Patent Office 3,356,178
Patented Dec. 5, 1967

3,356,178
METHOD AND APPARATUS FOR SEISMIC EXPLORATION
David M. Nash, Jr., El Paso, Tex., assignor to Shell Oil Company, New York, N.Y., a corporation of Delaware
Filed June 29, 1965, Ser. No. 467,925
8 Claims. (Cl. 181—.5)

ABSTRACT OF THE DISCLOSURE

An apparatus for generating seismic waves using a plurality of spark discharges that are fired in a time sequence to provide a reinforced seismic wave. The spark electrodes are disposed in a bell-shaped housing that may be filled with a dielectric liquid containing conductive particles.

---

This invention relates to the art of geophysical exploration and, more particularly, pertains to a method and apparatus for generating seismic waves such as are employed in seismic prospecting methods for identifying underground earth strata and locating oil.

As is well known in the art of seismic prospecting, an artificially created seismic shock is imparted ot the earth's surface and the resulting earth motion is detected and recorded at selected points or seismometer stations located at known distances from the shock imparting or shot point. The shape or structure of the underground strata near the earth's surface can then be determined by correlation and investigation of the recorded signals.

The most generally accepted method of creating the artificial impacts or disturbances to the earth's surface is by means of explosives such as dynamite. Such artificial impacts are normally produced by drilling a shot hole into the earth's surface below the so-called weathered layer and then positioning and exploding a charge of dynamite at the bottom of the shot hole. While this method has the advantage of producing a relatively steep seismic or pressure wave in the earth, the method, in addition to being inherently dangerous, is both expensive and time consuming. This is to a large measure due to the time required to drill the shot hole and place the dynamite therein. Moreover, the use of dynamite for creating seismic or artificial disturbances has the further disadvantage that the resulting explosion damages the land, for example, by forming a cavity therein, making it impossible to impart two or more shots to the earth at the same point under identical conditions. Additionally, the resulting cavity in the earth forms a hazard to people and livestock and creates an eyesore on the property and, accordingly, must be refilled, resulting in a still further expenditure of time and money.

In order to overcome some of the deficiencies and problems of the method of creating artificial seismic waves by means of an explosive, another well-known method of creating the seismic impacts has been developed which entails the dropping of a heavy weight onto the ground. While this method overcomes the objections to the method using an explosive, namely, damage to the earth, expense and time needed to set the charges, it inherently has a number of deficiencies which are troublesome for accurate seismic prospecting. For example, due to the unevenness of the terrain being explored, the weight cannot be dropped from the same height each time a shot is being recorded. Moreover, because of inherent problems in the method and mechanism for dropping the weight which is initiated by a signal from the recording mechanism, various time delays are often introduced into the system. Because of these two factors, the time interval between the signal releasing the weight and the time the weight contacts the ground and imparts a seismic wave thereto is not always the same, and accordingly the time of impact, which is necessary when attempting to composite a number of recorded records from different shots, is not known. It has therefore become the practice to record a signal from an impact switch mounted on the weight and set at a predetermined "G" or acceleration level which produces a signal indicating the time of impact. However, since, as indicated above, the time between the release signal and the impact switch signal varies according to the drop height, terrain, etc., a problem is still presented when trying to composite or correlate a number of recorded seismic traces due to the fact that the traces are usually recorded using the time of the weight release signal as a reference time. This variation in time often necessitates the shifting of the seismogram traces during the study of the results to produce correlation, a process which is both unwanted and expensive. It should also be noted that although the weight dropping techniques is relatively fast as compared to the explosive technique, the amount of energy that can be imparted to the earth with a weight dropping technique is limited by the size of the weight which can be handled by a practical vehicle and, accordingly, is less than the energy which can be derived with an explosive. Accordingly, techniques have been derived wherein the weight is dropped a number of times at a single location. It should be noted that with such a technique a period to time is still required to raise the weight following each drop period. While this period of time may be small for any one shot location, in a seismic survey wherein a great number of shot points are utilized the total time required may be quite substantial. Moreover, seismic waves produced by this technique are often lacking in the higher frequencies of the seismic spectrum (0–500 c.p.s.). This is caused by in effective coupling to the ground due to uneven terrain and improper weight position relative to the plane of the earth at the impact instant.

In order to overcome the problems inherent in the explosive and weight dropping methods of artificially creating seismic disturbances, it has been proposed to create the seismic impacts by means of shock wave energy created in a liquid by a spark discharge therein. Such a system is shown, for example, in the copending United States application of J. W. Miller, Ser. No. 273,967, filed Apr. 18, 1963, entitled, "Method and Apparatuses for Seismic Exploration," now Patent 3,268,028. According to this application, a spark is created, by discharging a capacitor through a spark gap, in a liquid-filled dome having a flexible diaphragm across its open end which is in contact with the earth. The spark discharge must be of sufficient energy to create a plasma bubble in the liquid which then expands to form a compressional wave which strikes the diaphragm and thereby transmits the energy in the plasma to the earth as a seismic disturbance. Seismic waves created in this manner are of short duration but of high intensity, and the instant of firing may be accurately controlled and recorded.

One of the problems inherent in this system, and in fact inherent in all prior art systems utilizing the phenomenon of pressure waves created in a liquid by means of a spark discharge, is the efficiency of the system to transform the electrical energy supplied to the spark gap to compressional wave energy. Normally the efficiency of such a system is very low because of the large portion of the energy supplied to the electrode which is necessary to ionize the material in the gap in order to form a spark, thereby permitting only the remaining quantity of transmitted electrical energy to be transformed direcly to pressure or compressional waves. In many applications, as much as 45 percent of the supplied electrical energy is required to create the ionization arc and, accordingly, it can be seen that this presents a serious problem. In prior art devices utilizing the phenomenon of pressure waves created by spark discharge in a liquid, the problem of reducing the quantity of the supplied energy needed to ionize the gap has been overcome by means of a procedure known as "arming the gap." For example, this may consist of applying an additional source of potential across the gap which aids in ionizing the gap and allows the major portion of the energy normally applied across the gap to be converted to a pressure pulse. Another method of "arming the gap" is to place a small piece of highly conductive material between the positive and negative electrodes of the gap which quickly conducts a high current and vaporizes into an ionized path when the discharge potential is applied to the gap. While such methods are feasible when relatively low energy pressure pulses are desired, or a relatively slow repetition firing rate is used, in a system for use as a seismic wave generating source wherein extremely high voltages are utilized and a fast system firing cycle is desired, for example, the electrical energy applied across the spark gap may be in the order of 15 kilojoules repeated every 6–10 seconds, such prior art methods of arming the gap are not feasible in view of either the extremely large additional power supply required or the mechanical considerations involved in physically arming the gap.

It has been discovered, however, that the problem of reducing the time required for ionization of the spark gap, and consequently increasing the efficiency of the conversion from electrical energy to pressure waves, may be accomplished by placing electrically conductive particles in suspension in the dielectric liquid. The conductive particles added to the dielectric liquid may be of any suitable material, for example, metal, carbon, etc., which will remain in suspension and preferably is added to the liquid in the form of a powder so as not to form a short circuit across the spark gap in the liquid. It should be noted that the addition of the finely divided metal particles or conductive particles to the liquid does not appreciably change the resistance of the liquid since, in all probability, the particles in suspension are not in contact with one another. However, when the electrical energy is applied across the spark gap, the field created across the gap tends to draw the particles together, thereby reducing the quantity of energy necessary to ionize the gap and thereby the ionization time. As an example of a ratio of particles to fluid which may be utilized in such a system, it has been found that the addition of approximately 4 pounds of powdered aluminum to approximately 20 gallons of water and the addition of a small quantity of a suspending agent, such as Methocel, appreciably reduces the ionization time required. Thus, the problem of "arming the gap" is automatic at each cycle of firing and the firing cycle time can be reduced for more efficient operation.

Another problem which presents itself with pressure waves generated by spark discharges in a liquid is that of coupling greater quantities of the generated energy within the seismic spectrum to the earth. As indicated above, the pressure pulses generated by a single spark discharge in a liquid is normally a very short pulse of intense energy. The short duration of the relatively intense generated pressure pulse, however, is not normally readily acceptable to the earth, i.e., the response time of the earth is longer than the pulse duration, and, accordingly, the efficiency of the amount of energy effectively coupled to the earth as a seismic wave is decreased. It has been found, however, that if the energy can be spread out over a time period which is more susceptible to the earth, the efficiency of coupling may be improved.

One obvious expedient which presents itself in order to lengthen the time or duration of the generated pressure pulse is to apply the quantity of electrical energy across the spark gap over a longer period of time. However, a single pulse of electrical energy of longer duration applied to a single spark discharge electrode does not produce the desired result since such systems have the property of exhibiting the phenomenon that the arc extinguishes itself after a short period of time, thereby requiring new ionization and reducing the quantity of the energy which is actually transformed to a pressure wave. Applicant has found, however, that the effective quantity of energy coupled to the earth may be increased by sequentially creating a plurality of spark discharges in a single body of liquid, thereby creating a plurality of pressure pulses, with the time between successive discharges being such that the pressure pulses arrive at the diaphragm in a manner whereby they are additive and hence create a single prolonged pressure wave of a duration which is more acceptable to the earth. This results in more energy in the seismic spectrum (0–500 cycles per second) being coupled to the earth without a loss in energy of any of the individual pressure pulses. In order to make the pulses additive in the proper manner at the diaphragm, successive presure pulses must arrive at the diaphragm before the diaphragm has recuperated or recovered from the previous pressure pulse. The actual time delay between successive pulses for maximum coupling, however, is determined by the characteristics of the earth, i.e., its relaxation time. Obviously, in order to provide effective transmittal of the compressional wave generated in the dome to the ground to produce a seismic disturbance therein, it is necessary that the bottom of the dome and in particular the diaphragm remain coupled to or in contact with the ground at the instant a pressure pulse strikes the diaphragm. However, as the pressure pulses are sequentially produced in the liquid, the total pressure in the dome eventually becomes sufficient to overcome the weight tending to hold the dome on the ground, i.e., the weight of the dome and any weight loading imposed on the dome by the dome handling mechanism, and lifts the dome momentarily from the ground to release the pressure. Accordingly, the time required for this lifting to occur, which is in effect a time constant for a system including the earth, the dome, and the dome handling mechanism, limits the maximum time between the first and last pressure pulses generated in the dome during any firing sequence because when the last usable pressure pulse arrives at the diaphragm, the diaphragm must be in contact with the earth and not recovered from the preceding pulse.

Briefly, then, according to applicant's invention, the above results are obtained by providing a heavy, thick-walled, dome-shaped housing having its open end adjacent the ground; a flexible diaphragm sealing the open end of the housing to form a chamber therein; a dielectric liquid such as water, and preferably having finely divided conductive particles suspended therein, substantially filling the chamber; at least one spark discharge electrode supported by the housing and extending into the liquid; and means for selectively applying a pulse of relatively high DC voltage across the spark discharge electrode to ionize the gap in the electrode and form a shock wave or pressure pulse in the liquid. The generated shock waves will then travel through the liquid and be transmitted to the earth via the flexible diaphragm. In order to couple the maximum amount of energy to the earth in the seismic spectrum as indicated above, a plurality of spark discharges are created in the liquid in a desired timed sequence to produce the succession of pressure pulses at the diaphragm and hence the broadened resultant pressure pulse on the earth. Although this sequence of spark discharges may be created by sequentially connecting a plurality of charged storage capacitors across a single spark discharge electrode, care must be taken to insure that the time between successive applications of the electrical energy to the spark discharge electrode is sufficiently long to allow the material in the gap to become deionized so that each application of electrical energy will generate a high energy pressure pulse. Since this time is often longer than the optimum time required between successive pressure pulses so that they arrive at the diaphragm in an additive manner to produce a single prolonged pressure pulse, the preferred embodiment of the dome is provided with a plurality of spark discharge electrodes, each of which is provided with an individual source of relatively high DC voltage, i.e., a charged storage capacitor, and control means for selectively connecting each of the spark discharge electrodes to its respective source of electrical energy in a desired timed sequence.

Applicant's invention and the advantages thereof will be more clearly understood from the following detailed description when taken in conjunction with the accompanying drawing wherein.

Figure 1:
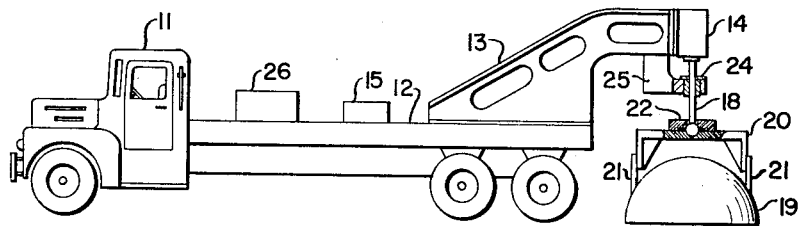
FIGURE 1 is a side view of the seismic wave generating equipment according to the invention mounted on a seismic truck.

Referring now to FIGURE 1 of the drawings, there is shown a truck 11 having fixedly mounted on the bed thereof a truss or bridge member 13. The truss member 13 may be of any form suitable for supporting a weight of from 2 to 5 tons.

The truss member 13 extends laterally beyond the rear end of the bed 12 of the truck 11 and has rigidly mounted to the end thereof a vertically acting piston or jack 14. Preferably, the piston or jack 14 is of the hydraulically operated type which is well known in the art. Hydraulic pressure fluid for operating the piston 14 is provided from any suitable source 15 which is connected to the cylinder of the piston 14 by suitable hoses (not shown).

Connected to the piston rod 18 of the hydraulic piston 14 is the large diameter bell- or dome-shaped housing of a compressional wave transducer 19 according to the invention. Preferably, the transducer 19 is connected to the piston rod 18 via a member 20 which is journaled in a plurality of flanges 21 rigidly connected to the transducer 19, and a universal type joint such as a ball joint 22 to provide for pivotal movement between the transducer and the axis of the piston rod 18 in order to facilitate placing the dome properly on the ground for maximum coupling thereto, i.e., so that the bottom of the transducer 19 engages the ground. In addition to raising and lowering the transducer 19, the hydraulic piston 14 serves to weight or exert pressure on the transducer 19 when it is in contact with the ground to aid in preventing the dome from lifting off of the ground due to the large energy pressure pulses created therein. This weighting may, for example, be of the order of 4–5 thousand pounds. In order to insure that the pressure exerted on the dome 19 by the piston 14 is at all times in a substantially downward direction, the piston rod 18 preferably passes through a vertically oriented bushing 24 mounted in a flange 25 connected to the truss 13.

Also mounted on the truck bed 12 and indicated generally by the reference numeral 26 are the electrical energy sources and control circuitry for the seismic wave generating transducer 19. The details of the electrical apparatus 26, which is connected to the transducer 19 by suitable leads (not shown in this figure), will be more fully described below with respect to FIGURE 4.

Figure 2:
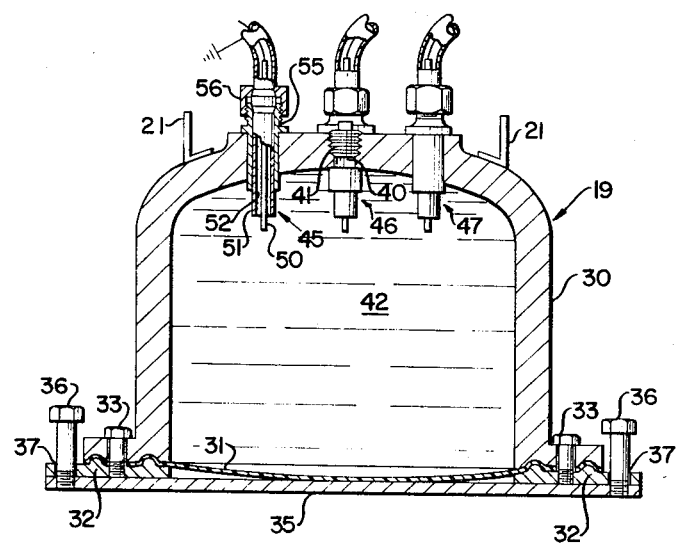
FIGURE 2 is an elevation, partially in section, of the preferred embodiment of the seismic wave generating transducer according to the invention.
Figure 3:
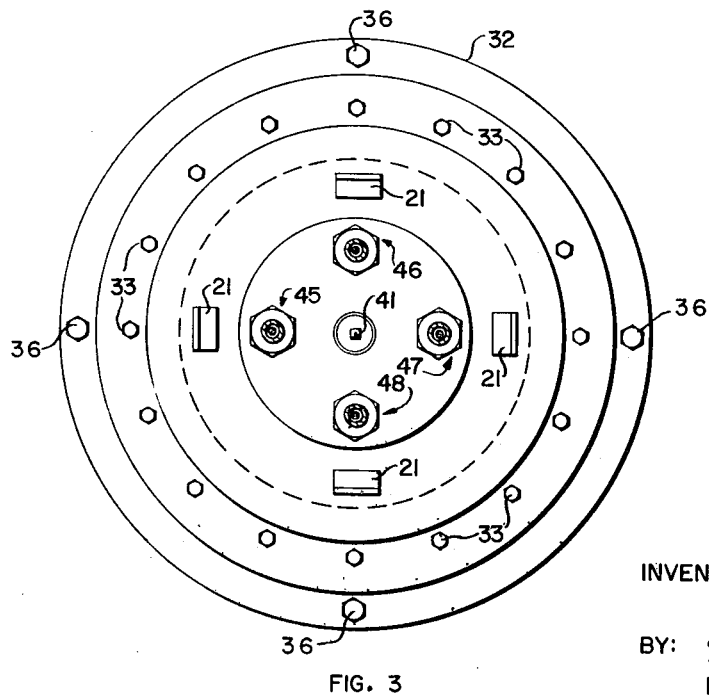
FIGURE 3 is a plan view of the transducer shown in FIGURE 2.

Turning now to FIGURES 2 and 3, there is shown the details of the preferred embodiment according to the invention of the seismic wave generating transducer 19. As shown in the drawings, the transducer 19 consists generally of a heavy, thick-walled, dome-shaped housing 30 having its open end, which is in contact with or adjacent to the ground, sealed by means of a relatively thin flexible diaphragm 31, for example, neoprene, to form a closed chamber within the housing 30. The diaphragm 31 is sealed to and maintained positioned against the housing 30 by any convenient clamping means, as, for example, the ring 32 and a plurality of bolts 33. The dome 30 may have any desired shape such as hemispherical, semi-elliptical, parabolic, etc., which tends to reflect pressure waves generated in a substantially single direction, i.e., toward the open end. The walls of the dome 30 must be constructed of a material, such as steel, having sufficient strength to withstand the large energy stresses imparted thereto by the pressure pulses generated therein, and of sufficient weight to provide a mass having a large inertia factor to further aid in preventing the dome from leaving the ground because of the pulses generated therein. For example, a dome approximately 3 feet in diameter and 2 feet in height constructed of 2-inch steel has been successfully employed.

While not necessary for the operation of the transducer 19, preferably, as indicated in the drawings, the dome 30 is also provided with a metal plate 35 which extends across the open end thereof adjacent the outer surface of the diaphragm 31 in order to protect the diaphragm 31 against rupture due to sharp objects on the ground, thereby prolonging the useful life of the diaphragm 31. To avoid creating stresses in the dome 30 due to the pressure pulses attempting to flex the plate 35, the plate 35 is mounted in such a manner that it is free to move in a direction parallel to the vertical axis of the dome, i.e., in the direction of the pressure pulse transmitted to the ground. For example, as shown in the figure, the plate 35 may be mounted on the dome 30 by means of a plurality of elongated studs 36 which extend upwardly through a corresponding plurality of holes or openings 37 in a laterally extending flange of the ring 32. Mounted in this manner, the plate 35 is free to move in a downward direction a distance equal to the length of the studs 36, for example, 2 inches, and hence does not create any additional stresses in the dome 30.

The dome 30 is also provided at its uppermost point with an opening 40 which is normally sealed by any convenient means such as a threaded plug 41. This opening is utilized to fill the dome with the noncompressible dielectric liquid 42. Preferably, as indicated above, the liquid, which, for example, may be plain water, has finely divided conductive particles such as powdered aluminum suspended therein. Although not shown, the dome 30 may be provided with means to circulate the fluid through the dome, thereby tending to insure that the conductive particles remain in suspension and to continuously add fluid to the system to replace the liquid converted to gas by the electrical discharges therein, and to remove waste gases. However, it has been found that in a practical application, such a circulating system is not generally required since the movement imparted to the transducer when transporting it from one location to another and also the motion imparted to the fluid by the pressure waves created therein is sufficient to maintain the particles in suspension. Moreover, it has also been found that the quantity of liquid converted to gas and consequently the amount of gas formed in the dome is not normally of a sufficient quantity after reasonable periods of use, for example, one day, to require either removal of the gas or replenishment of the liquid to insure proper operation of the transducer. However, as indicated, if the quantities become critical, then an input and exhaust system for the liquid may be supplied.

In order to create a spark discharge within the liquid 42, the transducer 19 is preferably provided with a plurality of spark discharge electrodes, i.e., a pair of spaced conductors defining a spark gap therebetween. Preferably, as shown in the figures, the transducer 19 is provided with four spark discharge electrodes 45, 46, 47 and 48. While any form of spark discharge electrode may be used, for example, conventional spark plugs, preferably the spark discharge electrodes utilized consist of a conductive rod 50 axially mounted within a conductive cylinder 51 and bonded thereto by means of a ceramic or plastic dielectric material 52 whereby the rod 50 and the cylinder 51 form two adjacent conductors defining a spark gap therebetween. The spark discharge electrodes 45–48 are mounted in the dome 30 in any convenient manner, for example, by means of sleeves 55 secured to the dome by welding or screw threads, and locking nuts 56 to provide for easy removal.

As indicated in the drawings, the plurality of spark electrodes are symmetrically distributed about the vertical axis of the dome and are positioned such that the spark gaps formed in each of the electrodes 45 to 48 are located in a common plane parallel to the plane of the diaphragm 31. This spacing insures that the pressure waves generated by each of the spark discharge electrodes will be of similar shape and that the travel time required for each of the generated pressure pulses to reach the diaphragm is equal. This is an important consideration in the firing method according to the invention wherein the time of arrival of successive pressure pulses created in the fluid at the diaphragm is closely controlled and also in those situations where the dome is used to create successive short pulses in the earth from a single location.

As further indicated in the figure, the spark discharge electrodes are preferably suspended from the top of the dome so that the respective electrodes lie in planes parallel to the vertical axis of the dome. While it is not necessary that the electrodes be so mounted in the dome 30, it has been found that mounting them in this manner reduces the stresses created in the electrodes by the generated pressure pulses. The reduction of these stresses, which tend to break the electrodes, results in greater life for the individual electrodes.

Figure 4:
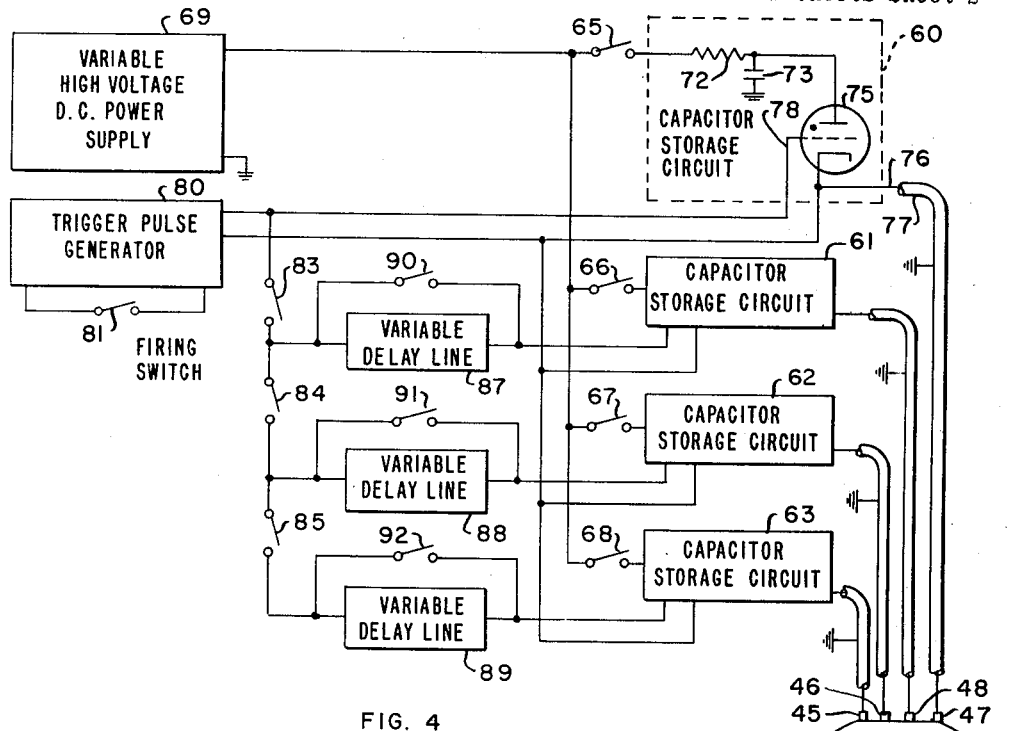
FIGURE 4 is a schematic diagram of the electrical control circuitry for the transducer of FIGURE 2.

Turning now in FIGURE 4 of the drawings, there is shown schematically the electrical circuitry necessary to control the firing of the spark gap electrodes 45 to 48 according to applicant's novel firing method. As shown in the figure, each of the spark discharge electrodes 45–48 is connected to an individual source of relatively high DC potential which consists essentially of a charged storage capacitor included in a corresponding plurality of identical capacitor storage circuits 60–63. The inputs to these capacitor storage circuits 60–63 are connected in parallel via respective switches 65–68 to the output of a high voltage DC power supply 69 which, for example, produces a maximum output voltage of approximately 20 kilovolts. Preferably, the power supply 69 is variable so that the charge applied to the storage capacitors in the capacitor charging circuit 60–63 may be varied to control the magnitude or intensity of the pressure pulse created in the transducer 19.

As shown with respect to the capacitor storage circuit 60, each of the respective storage circuits 60–63 includes a series connected, current limiting and isolating resistor 72 and a storage capacitor 73 connected across the output terminals of the power supply 69. Each of the storage capacitors 73 must have a high capacitance rating, and may in fact comprise a plurality of parallely connected pulse power capacitors. Preferably, each of the storage capacitors 73 has the ability to store a charge having approximately 15 kilojoules of energy. The charging of the capacitors 73 in the respective storage circuits 60–63 is accomplished by closure of the switches 65–68, respectively. This permits the charging of the capacitors 73 to the voltage of the power supply 69. After the capacitors 73 have been charged, the switches 65–68 are opened to disconnect the power supply from the capacitors as a precautionary measure to prevent any of the stored energy from returning to the high voltage power supply.

After the switches 65–68 have been opened, discharge of the capacitors 73 via the spark discharge electrodes 45–48 is initiated by energizing normally open switching devices such as normally nonconducting three-electrode rectifiers 75 to connect the capacitors 73 across the pair of conductors forming the respective spark discharge electrodes 45–48. For example, once a rectifier 75 is rendered conductive the discharge path of the capacitor 73 connected thereto comprises a series circuit including capacitor 73, rectifier 75, the center conductor 76 of a coaxial cable, the center conductor 50 of the spark discharge electrode, the spark gap formed in the electrode, the cylindrical conductor 51 in the spark gap electrode (see FIGURE 2), and a return path to the grounded side of the capacitor 73 via the shielded portion 77 of the coaxial cable. Discharge of the capacitor 73 by this path causes a spark to be generated across the spark gap and results in a generation of a steep high energy pressure pulse in the liquid 42 in the housing 30 for transmission to the earth.

The three-electrode rectifiers 75, which may, for example, be ignotrons or other electronically controlled switching devices, are rendered conductive by providing a suitable triggering pulse of a small magnitude to the control electrode 78 of the rectifiers 75. To this end, each of the rectifiers 75 is connected to the output of a suitable trigger pulse generator 80 which produces the desired trigger pulse on momentary closure of a firing switch 81. The trigger circuits for discharging the capacitor storage circuits 61–63 are preferably connected to the trigger pulse generator via switches 83–85, respectively, so that one or more of the charged capacitors may be discharged as desired. In order to initiate the discharge of the capacitors 73 in a desired sequence, the trigger circuits for the capacitor storage circuits 61–63 have connected in series therewith variable delay lines 87–89, respectively. Preferably, the variable delay lines 87–89 are provided with bypass circuits including normally open switches 90–92, respectively, so that when the switches 90–92 are closed, the respective variable delay lines are short circuited, thereby enabling the simultaneous discharge of two or more of the capacitors 73 when such a firing sequence is desired.

In order to energize the seismic wave generator 19 according to applicant's novel method, i.e., the sequential generation of a plurality of pressure waves in the generator 19 to produce a single prolonged resultant pressure wave at the diaphragm 31, the variable delay lines 87–89 are adjusted so that the single trigger pulse generated by the trigger pulse generator 80 initiates discharge of the storage capacitors 73 in a time sequence such that the individual pressure pulses generated in the liquid in the dome 30 arrive at the diaphragm 31 in a manner to be additive and produce the desired elongated single resultant pressure pulse, resulting in the coupling of greater percentage of the energy in the seismic spectrum to the ground. In order that the pulses be additive at the diaphragm in the desired manner, the delay between successive pulses must not exceed the recuperation or recovery time of the diaphragm from the preceding pulse, since, otherwise, the energy imparted to the earth will be in the form of a plurality of short pulses. It is noted that theoretically the actual amount of delay to be inserted between successive pulses varies according to the composition and composure of the earth's surface and near surface material, since these factors will in fact vary to some extent the recovery time of the diaphragm. Accordinly, if the ground to which the seismic shock is to be imparted is relatively hard, then a shorter delay time should be inserted between the successive spark discharges and, conversely, if the earth is relatively soft, then a longer delay may be used. It has been found that delays in a range of between 150 and 2500 microseconds between successive discharges proves satisfactory to produce the most efficient coupling for generators to be used to initiate seismic waves, and that delays of approximately 500 microseconds between discharges in a four-electrode dome as disclosed prove sufficiently efficient for most conditions. Utilizing a four-electrode transducer as disclosed and with 500 microsecond delays between discharges, a gain of between 5 and 6 db has been realized in the amount of reflected or refracted seismic energy received by the geophones over that produced by a corresponding quantity of energy producing a single pressure pulse of short duration.

Figure 5:
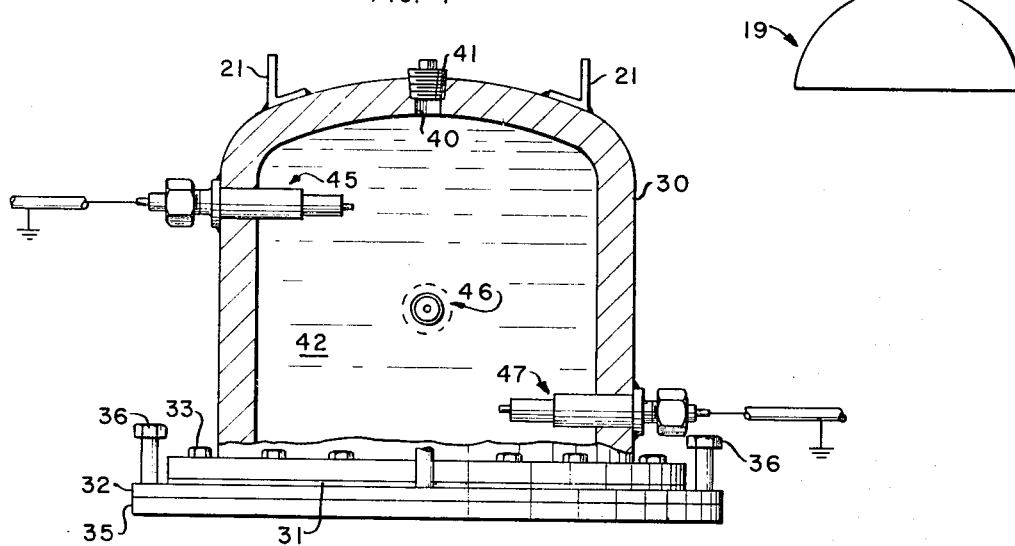
FIGURE 5 is an elevation, partially in section, of an alternate embodiment of the seismic wave generating transducer shown in FIGURE 2.

Referring now to FIGURE 5, there is shown an alternate arrangement for producing a succession of pressure pulses at the diaphragm to achieve the same results as that achieved with the system of FIGURE 4 and the transducer of FIGURES 2 and 3. Broadly, the seismic wave generator shown in FIGURE 5 is similar to that shown in FIGURE 2 with the exception that instead of the plurality of electrodes being suspended from the top of the dome 30, the electrodes 45–58 are mounted in vertically displaced horizontal planes, i.e., at different levels. The electrodes 45–48 (48 not being shown in this figure) are preferably symmetrically distributed about the periphery of the dome as shown. With this arrangement, the vertical displacement between the electrodes must be such as to create the desired delay between the generated pressure pulses arriving at the diaphragm when the electrodes are all fired simultaneously. Simultaneous firing of the four electrodes may be accomplished with the circuit of FIGURE 4 by closing the switches 83–85 and 90–92.

As can easily be appreciated, the disclosed invention provides a relatively simple, novel and efficient method for producing artificial seismic waves which incorporates the desired features of the prior art methods, i.e., broad spectrum, accurate control, while eliminating the undesirable features, i.e., speed of operation, disruption of the earth.

Obviously various modifications of the invention are possible in the light of this disclosure without departing from the spirit of the invention. It is therefore to be understood, that within the scope of the appended claims, the invention may be practiced otherwise than as specifically illustrated.

I claim as my invention:

1. Apparatus for generating seismic waves for geophysical exploration purposes comprising:
    a heavy dome-shaped housing adapted to be positioned with its open side in contact with the surface of the earth;
    a flexible diaphragm closing the open end of said housing in a fluid-tight manner and thereby defining a closed chamber within said housing;
    a dielectric liquid substantially filling said chamber;
    a plurality of spark discharge electrodes supported by said housing and extending into the liquid in said chamber, said discharge electrodes being mounted in a common plane parallel to said flexible diaphragm;
    separate voltage means for each of said electrodes for supplying a relatively high DC voltage; and
    control means for selectively connecting said separate voltage means across each of said spark discharge electrodes, in a predetermined timed sequence, thereby causing each of said electrodes to generate a spark, to produce a corresponding plurality of sequential substantially downward traveling pressure pulses in said liquid, whereby the pressure pulses in said liquid will strike said diaphragm in succession to form a single prolonged pressure wave on said diaphragm.

2. The apparatus of claim 1 wherein said plurality of electrodes are suspended from the top of said housing.

3. The apparatus of claim 1 wherein said plurality of electrodes are symmetrically distributed about the vertical axis of said housing.

4. A seismic wave generator comprising:
    a heavy thick-walled dome-shaped housing having its open end adjacent the ground;
    a flexible diaphragm closing the open end of said housing in a fluid-tight manner;
    a dielectric liquid substantially filling said chamber, said liquid having finely divided conductive particles suspended therein;
    a plurality of spark discharge electrodes mounted in the upper portion of said housing and extending in a downward direction into said chamber whereby said electrodes are immersed in said liquid, said plurality of electrodes being symmetrically distributed about the vertical axis of said housing;
    a corresponding plurality of capacitors charged to a predetermined relatively high voltage; and
    control means for connecting each of said capacitors across a separate one of said electrodes in a predetermined timed sequence to produce a spark at each of said electrodes, thereby discharging said capacitors and generating a corresponding plurality of pressure pulses in said liquid, with the time between the generation of successive sparks being such that the generated pressure pulses reinforce each other at the diaphragm to produce a single prolonged pressure pulse on said diaphragm.

5. The apparatus of claim 4 wherein said control means comprises:
    a separate normally open switch means connected between each of said capacitors and its respective electrode; and
    means responsive to an input signal thereto for selectively energizing said switch means in a predetermined sequence to cause said switch means to connect said capacitors and electrodes.

6. The apparatus of claim 5 wherein said switch means is a normally non-conducting three-electrode rectifier and wherein said means for selectively energizing said switch means comprises:
    a trigger pulse source coupled to the control electrode of each of said rectifiers;
    means for energizing said trigger pulse source to initiate an output pulse therefrom; and
    means connected between the output of said trigger pulse source and said control electrodes for selectively delaying said output pulse from said trigger pulse source whereby said rectifiers may be rendered conductive in a desired timed sequence.

7. In a system for generating a seismic wave in the earth by means of a pressure wave created in a liquid-filled heavy dome by a spark discharge in said liquid and transmitted to the earth via a diaphragm which seals the open bottom end of said dome; the method of increasing the total quantity of energy coupled to the earth comprising:
    sequentially creating a plurality of spark discharges in said dome to produce a coresponding plurality of pressure pulses therein; and
    adjusting the time between consecutive discharges to between 150 and 2500 microseconds so that the individually generated pressure pulses arrive at the diaphragm in succession and before the diaphragm has recuperated from the preceding pressure pulse, whereby the individual pressure pulses created in said dome are additive at said diaphragm and produce a single prolonged pressure wave.

8. The method of claim 7 wherein the time between successive spark discharges is approximately 500 microseconds.

References Cited

UNITED STATES PATENTS

| | | | |
|---|---|---|---|
| 1,945,039 | 1/1934 | Hansell | 340—12 |
| 2,167,536 | 7/1939 | Suits | 340—12 |
| 3,007,133 | 10/1961 | Padberg | 340—12 |
| 3,225,252 | 12/1965 | Schrom et al. | 181—.5 |
| 3,268,028 | 8/1966 | Miller | 181—.5 |
| 3,286,226 | 11/1966 | Kearsley et al. | 181—.5 |

BENJAMIN A. BORCHELT, *Primary Examiner.*

SAMUEL FEINBERG, *Examiner.*

G. H. GLANZMAN, *Assistant Examiner.*